United States Patent [19]

Rajchman

[11] 4,137,551
[45] Jan. 30, 1979

[54] CATHODE ADDRESSING SYSTEM

[75] Inventor: Jan A. Rajchman, Princeton, N.J.

[73] Assignee: RCA Corporation, New York, N.Y.

[21] Appl. No.: 729,217

[22] Filed: Oct. 4, 1976

[51] Int. Cl.² .......................... H04N 5/66; G08B 5/36
[52] U.S. Cl. ..................................... 358/230; 340/744;
315/169.3; 340/781
[58] Field of Search ................ 358/240, 241, 59, 230;
340/324 M, 343, 166 EL; 315/169 TV, 84.6

[56] References Cited

U.S. PATENT DOCUMENTS

| | | | |
|---|---|---|---|
| 3,337,683 | 8/1967 | Sliker | 358/59 |
| 3,647,958 | 3/1972 | Sobel | 358/241 |
| 3,748,378 | 7/1973 | Garrison et al. | 358/240 X |
| 3,824,580 | 7/1974 | Bringol | 340/166 EL X |
| 3,940,757 | 2/1976 | Purchase | 358/240 X |
| 4,031,552 | 6/1977 | Bosserman et al. | 340/324 M X |

Primary Examiner—John C. Martin
Assistant Examiner—Aristotelis M. Psitos
Attorney, Agent, or Firm—E. M. Whitacre; G. H. Bruestle; G. E. Haas

[57] ABSTRACT

In an image having a plurality of cathode stripes, individual cathodes may be addressed using a system having a first resistor at one end of each of the cathodes and a second resistor at the other end of each of the cathode stripes. The first resistors are bussed so that X number of adjacent first resistors are connected in common to form Y groups; wherein X times Y equals the total number of cathode stripes. A plurality of first switches are connected to the groups of first resistors to selectively apply one of two voltage levels to each group. The second resistors are connected into X groups each having Y resistors. A plurality of second switches selectively switch one of two voltage levels to each group of second resistors.

3 Claims, 4 Drawing Figures

CATHODE ADDRESSING SYSTEM

BACKGROUND OF THE INVENTION

The present invention relates to large area cathodoluminescent image display devices having a plurality of cathode stripes; and particularly to systems for addressing the cathode stripes.

Flat large area cathodoluminescent display devices have been suggested for use in image displays, such as television. These devices may have a matrix of individually addressable electron sources formed by electron multipliers operating in a regenerative feedback mode. Such devices have a plurality of cathode stripes at one end of an electron multiplier and a cathodoluminescent screen at the other end. The electrons from the cathodes enter the multiplier, which amplifies the electron flow. Modulating, focussing and accelerating electrodes are between the multiplier and the screen to shape the electron beam and accelerate it toward the screen which is coated with phosphor material to emit light upon electron bombardment. The output of the electron multiplier also generates a feedback species, such as positive gas ions. These positive ions in the display device travel back to and strike the cathodes thereby emitting secondary electrons and completing a feedback loop so as to allow sustained electron emission.

Each of the cathode stripes is used to address a line in the image display. Particular image elements along each line are selected by addressing various electron multipliers. Therefore, in order to display a particular element on the screen, the corresponding cathode stripe and the electron multiplier must be activated. If the display device is to be used for a conventional NTSC television display, it must have a minimum of 483 cathode stripes for displaying the equivalent number of display lines. This results in a large number of electrical feedthroughs in the display envelope in order to address each of the cathodes individually as well as a complex circuit for addressing each of the stripes.

SUMMARY OF THE INVENTION

The present system for addressing the plurality of cathodes stripes in an image display device utilizes a plurality of first resistors each electrically connected to one end of a different cathode stripe. The first resistors are connected into Y groups of X adjacent first resistors; wherein X times Y equals the total number of cathode stripes. A first switch means is connected to the groups of first resistors to selectively switch different voltage levels to each group of first resistors. A plurality of second resistors are electrically connected to the other end of each of the cathode stripes. The second resistors are connected into X groups of Y resistors. A second switch means is connected to the groups second resistors for selectively switching different voltage levels to each group of second resistors.

DETAILED DESCRIPTION OF THE PREFERRED EMBODIMENT

Figure 1:
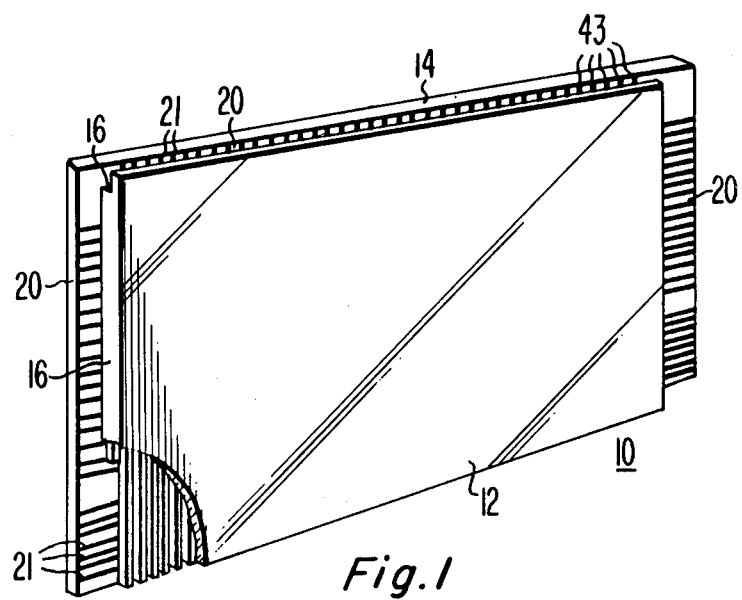
FIG. 1 is a perspective view of a flat image display device according to the present invention partially cut away.

With initial reference to FIG. 1, a large area image display device, generally designated as 10, has an envelope with a faceplate 12 and a rear panel 14 connected by four side walls 16, all of which may be made of glass. The rear panel 14 extends beyond the walls 16 forming terminal areas 20 having a plurality of electrical terminals 21 thereon. The interior surface of the faceplate 12 has a plurality of phosphor stripes thereon (not shown) forming the viewing screen of the device.

Figure 2:
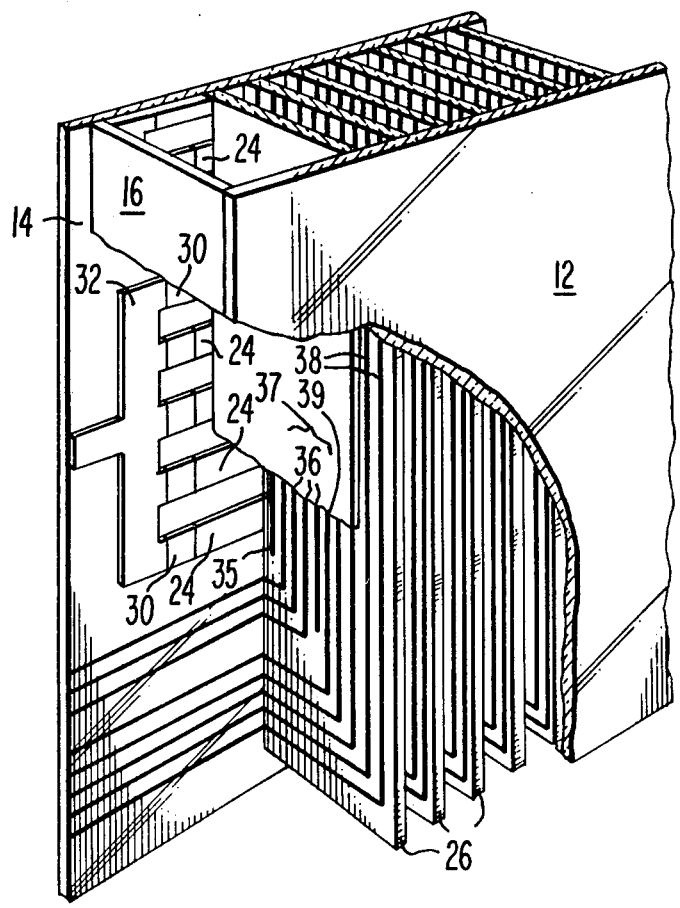
FIG. 2 is an enlargement of the cut-away section of FIG. 1.

With reference to FIG. 2, a plurality of parallel stripes 24 of an ion secondary emissive material, preferably magnesium oxide (MgO), are on the interior surface of the rear panel 14. Extending between the faceplate 12 and the rear panel 14 are a plurality of spaced parallel vanes 26 orthogonal to the cathode stripes 24. A plurality of electrodes 35, 36, 38, and 39 are on the surfaces of each vane 26. The first electrode 35 is an address electrode and the next three electrodes 36 on each vane surface form the dynode chain of the conventional electron multipler 37 which is formed between adjacent vanes 26. On both sides of each vane 26, between the electron multiplier 37 and the faceplate 12, are a plurality of accelerating and modulating electrodes 38 and 39. The modulating electrodes 39 form electron shutters which permit or inhibit electron flow depending upon the applied potential.

Figure 3:
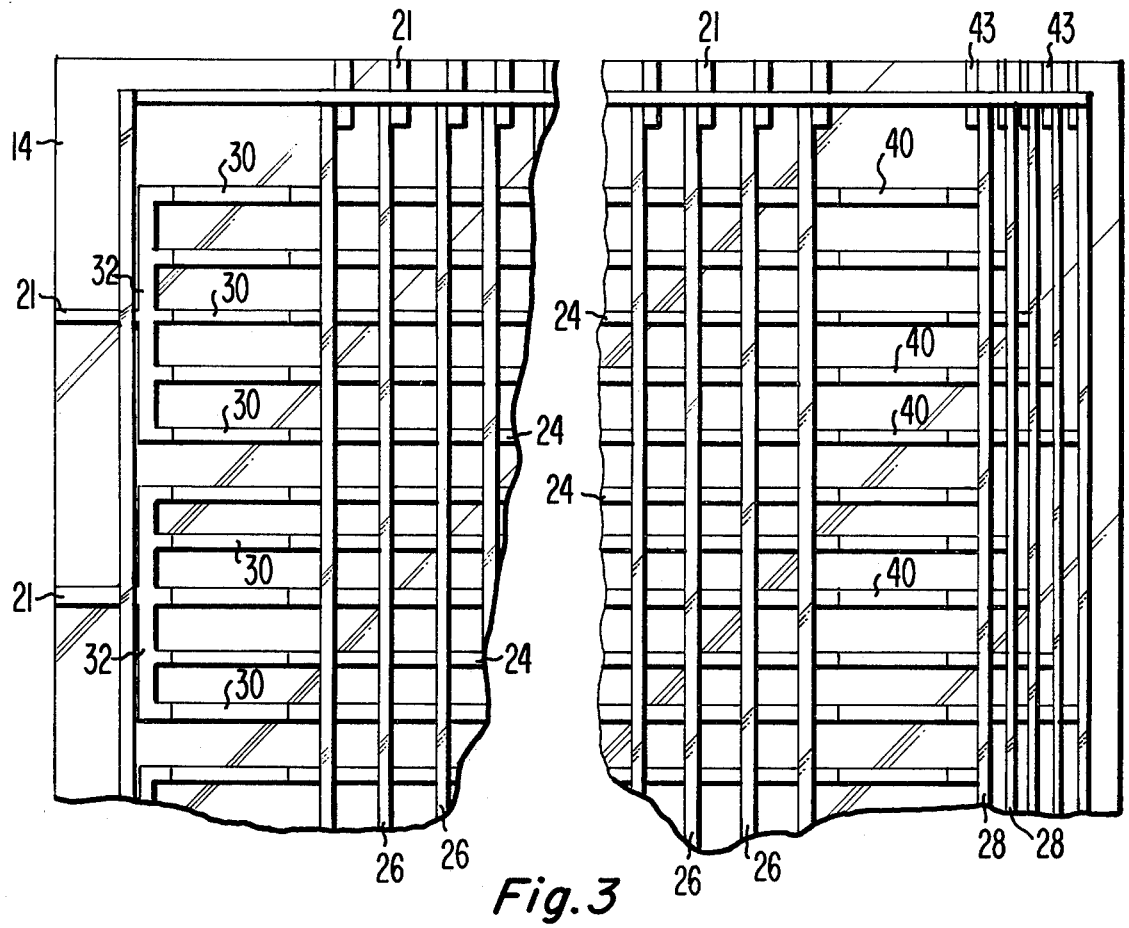
FIG. 3 is a plan view of a portion of the display.

At one end of each cathode stripe 24 is a first resistor 30 electrically connected at one end to the cathode stripe as shown in FIG. 3. The first resistors 30 are thin film strips of a resistive material, such as tin oxide, which are silk screened or painted on the surface of the rear panel 14. The other ends of the first resistors 30 are connected together in groups of five adjacent resistors by a first bus 32. Electrically connected to the other end of the cathode stripes 24 is a second resistor 40 similar to the first resistor 30. The second resistors 40 are connected to second resistor busses 42 (shown schematically in FIG. 4) on glass bus vanes 28 so that every fifth second resistor 40 is connected in common. The busses are brought outside of the envelope of the display device 10 to terminals 43 at one end of the top edge of the rear panel 14.

Alternately conventional resistors can be used for the first and second resistors, 30 and 40, respectively. In this case, one terminal of each resistor is connected to a cathode stripe while the other is bussed.

Figure 4:
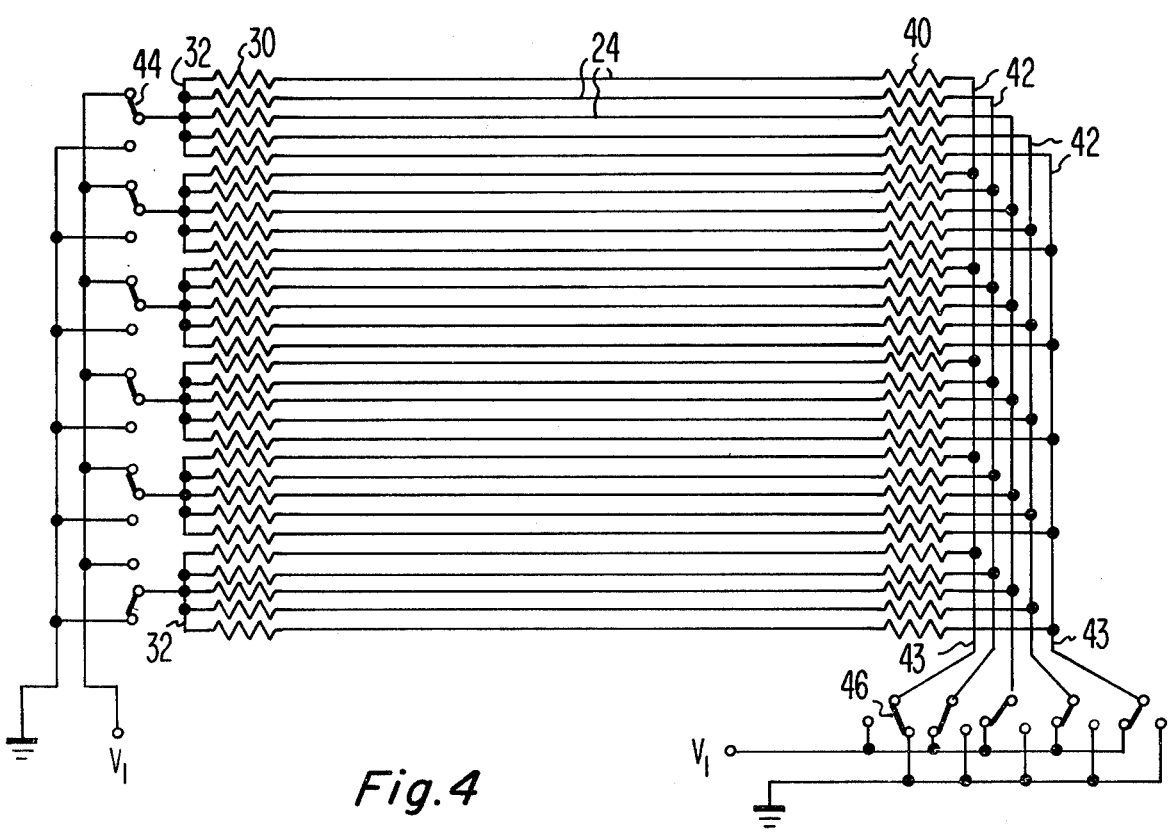
FIG. 4 is a schematic diagram of the address system of the present invention.

As shown in FIG. 4, a plurality of first switches 44 selectively connect each of the first resistor busses 32 to one of two voltages, designated ground and $V_1$, for example. A plurality of second switches 46 selectively connect each of the second resistor busses 42 to one of the same two voltage levels. Both the first and the second switches 44 and 46 may be conventional transistor switches.

When a cathode stripe 24 and an electron multiplier 37 are properly biased or activated, electrons will flow from the cathode into the multiplier 37 where they will be multiplied and directed toward the cathodoluminescent screen. Some of the electrons exiting the electron multiplier will strike residual gas atoms within the envelope, transforming the atoms into positive ions. The positive ions travel toward and strike the cathode stripe 24 completing a feedback loop. In order for sustained electron current emission to occur, the feedback loop gain must be equal to or greater than 1. The loop gain varies as a function of the cathode potential. When the cathode 24 is at the same potential as the address electrode 35, the loop gain has a nominal and essentially maximum value. When the cathode 24 is made positive, secondary electrons produced by the bombardment of the ions cannot reach the first dynode in the electron multiplier 37. The loop gain drops below unity to essentially zero at a cutoff voltage $V_p$ which is a negative potential below which the cathode ceases emitting electrons. Alternately when the cathode is made sufficiently negative, secondary electrons leave the cathode but miss all the dynodes of the multiplier and hence the loop gain drops below unity. Therefore, the electron flow to the multiplier and hence to the cathodoluminescent screen can be controlled by biasing each cathode stripe 24 so that the loop gain fluctuates above and below unity.

As shown in FIG. 4, a particular cathode stripe 24 may be addressed by selecting the proper first resistor bus 32 and the proper second resistor bus 42. The first and second switches 44 and 46, respectively, accomplish this selection by switching their particular set of buses between ground and $V_1$. The $V_1$ voltage level is equal to at least two times the cutoff voltage $V_p$. Therefore, there are three possible voltage combinations which can be applied to the first and second resistors of a given cathode stripe 24; i.e., ground potential applied to both resistors, $V_1$ potential applied to both resistors or ground applied to one resistor and $V_1$ to the other resistor. If the same potential, either ground or $V_1$, is applied to both of the resistors, the potential of the cathode stripe will be equal to the applied potential since no current will flow through the cathode stripe. However, if the ground potential is applied to one resistor and the $V_1$ potential is applied to the other resistor, current will flow through the cathode stripe. If the first and second resistors are approximately equal in resistance the potential of the cathode stripe will be the average of the two voltages, or in the case of ground and $V_1$ it will be equal to onehalf $V_1$ or a voltage which is greater than or equal to the cutoff voltage $V_p$. Therefore, the cathode 24 will only be biased "on" when both of its resistors are connected to the ground potential. By switching one of the groups of bussed first resistors to ground potential while maintaining all of the other groups of first resistors switched to the $V_1$ potential and switching one of the bussed groups of second resistors to the ground potential while maintaining the remainder of the second resistor busses at the $V_1$ potential, only one cathode stripe in the entire array will have both its resistors connected to the ground potential. Only this cathode 24 will be turned on since all of the other cathode stripes will be at a potential at least as great as the cutoff voltage $V_p$.

Any number of cathode stripes may be connected as shown in FIG. 4. If the first resistors are connected into groups of first X adjacent resistors there would be Y such groups wherein X times Y equals the total number of resistors and cathode stripes. In this case there would be X number of second resistor busses 42 each connecting Y second resistors 40 in common. In this manner, a particular cathode stripe may be selected by an X-Y addressing scheme. The use of a resistive matrix insures that only one cathode stripe will be activated for any unique X-Y combination. Therefore, the number of lead groups for connecting the control switches 44 and 46 to the cathode stripes 24 has been reduced from a total equal to the product of X and Y to the sum of X and Y. In addition, the number of switches and their related circuitry has been similarly reduced.

I claim:

1. A system for addressing a plurality of cathodes in an image display device with one of two different voltage levels, said system comprising:
    a plurality of first resistors each being electrically connected to one end of a different cathode;
    a first bus means connecting X adjacent first resistors in common to form Y groups wherein X times Y equals the total number of cathodes;
    a first switch means for selectively switching one of two different voltage levels to each group of first resistors;
    a plurality of second resistors each being electrically connected to the other end of a different cathode;
    a second bus means connecting each of the second resistors into X groups of Y resistors; and
    a second switch means for selectively switching one of two different voltage levels to each group of second resistors.

2. A method for individually addressing one of a plurality of cathodes with only two voltages wherein at least two resistors of substantially equal resistance are connected to each cathode and wherein at least one of said resistors is connected to each end of every cathode, the method comprising:
    applying a first voltage to both resistors of the cathode to be addressed which will enable electron emission from said cathode; and
    applying a second voltage which is at least twice the cathode cut-off voltage to at least one resistor of the cathodes which are not to be addressed.

3. The method as in claim 2 including applying either the first or the second voltage to the other resistor of each cathode which is not to be addressed.

* * * * *

UNITED STATES PATENT AND TRADEMARK OFFICE
CERTIFICATE OF CORRECTION

PATENT NO. : 4,137,551

DATED : 1/30/79

INVENTOR(S) : Jan Aleksander Rajchman

It is certified that error appears in the above-identified patent and that said Letters Patent is hereby corrected as shown below:

Abstract [57], line 1: insert --display-- after "image."

Signed and Sealed this

Seventh Day of August 1979

[SEAL]

Attest:

Attesting Officer

LUTRELLE F. PARKER
*Acting Commissioner of Patents and Trademarks*